Nov. 3, 1942.  G. F. RYAN  2,300,526
CUTTING DIE
Filed April 12, 1941
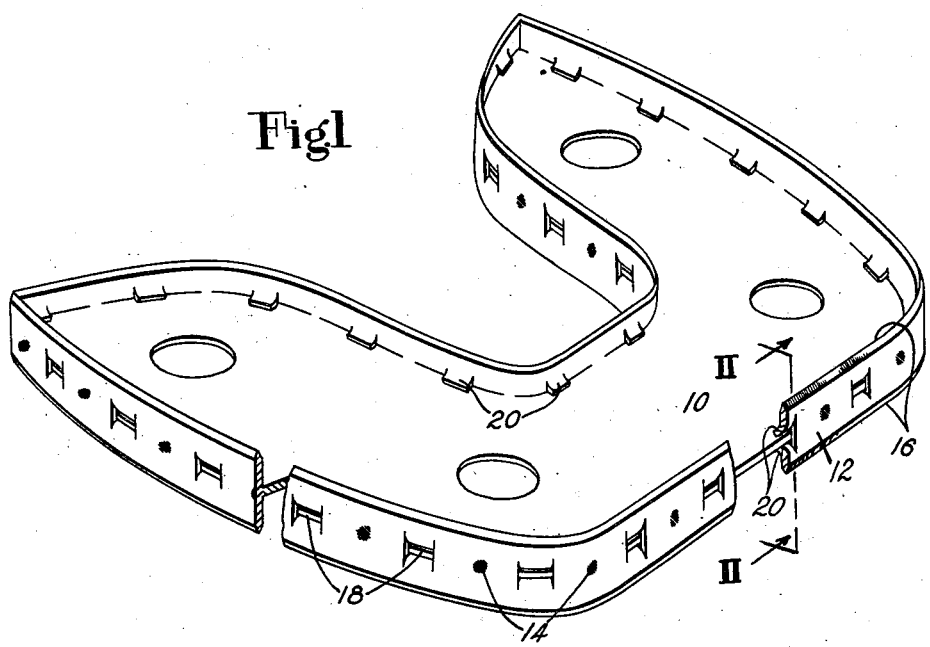
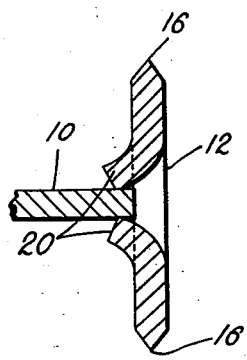
INVENTOR
George F. Ryan
By his attorney Patented Nov. 3, 1942

2,300,526

UNITED STATES PATENT OFFICE 2,300,526

CUTTING DIE

George F. Ryan, Peabody, Mass., assignor to United Shoe Machinery Corporation, Flemington, N. J., a corporation of New Jersey Application April 12, 1941, Serial No. 388,224

1 Claim. (Cl. 164—29)

This invention relates to cutting dies and is herein illustrated as embodied in a die for cutting out shoe parts of the type illustrated in United States Letters Patent No. 2,124,591, granted July 26, 1938, upon application filed in my name.

Dies of the type before-mentioned commonly comprise a sheet metal core, corresponding in outline to the outline of a blank to be produced and having secured thereto a blade terminating in the cutting edge in alinement with the edge of the core. It is an object of the present invention to provide a die of the type referred to, which is comparatively simple in its construction and one which can be readily manufactured at relatively low cost.

To this end and as illustrated, the invention provides a cutting die comprising a core, corresponding in shape to that of a blank to be produced and a strip of blade stock extending along the core and having portions struck therefrom upon opposite sides of the core and in engagement therewith, together with means for securing the blade stock to the core. Preferably and as shown, the portions struck from the blade stock are in the form of projections which closely engage the core upon opposite sides thereof to reinforce the blade stock, thereby maintaining it in fixed relation to the core against pressure, such as that applied to the blade stock by a presser member moved in such a way as to deliver a glancing blow. Preferably, too, the blade stock is secured to the core by spot welding the central portion of the blade stock to the edge of the core.

These and other features of the invention are disclosed in the following specification and accompanying drawing, and are set forth in the claim.

Fig. 1 of the drawing is a perspective view, partly in section, of a die constructed in accordance with my invention; and Fig. 2 is a cross sectional view on an enlarged scale taken along lines II—II of Fig. 1.

The die shown is a die for cutting shoe vamps from sheet material, such as leather, and comprises an a symmetrical core 10 in the form of a thin metal plate corresponding in shape to that of a vamp to be cut, and a double-edged blade 12 bent along the periphery of the core 10 and secured thereto by spot welds 14 forming connections between the central portions of the blade 12 and the edge portion of the core 10.

As shown, the blade 12 is formed of thin ribbon steel stock terminating in oppositely disposed cutting edges 16, the stock being secured to the core in such a manner that the cutting edges are located in a plane close to the plane of the edges of the core, so that the cutting edges conform to the shape of a blank to be cut. One of the cutting edges is suitable for use in cutting left blanks and the other for use in cutting right blanks.

In order to reinforce the blade against deformation in directions parallel to the faces of the core 10, the blade is slit along the central portion thereof, as indicated by reference character 18, and the material along each slit is bent inwardly to form tabs or flanges 20, which extend upon opposite sides of the core and are forced into engagement with the faces of the core. These tabs 20 thus form buttresses or abutments, which resist lateral deformation of the blade, thus to assist in maintaining the cutting edges in alinement with the edge of the core in order that the blanks cut will be of uniform size and shape.

In use, the die is placed upon sheet material to be cut, positioned upon a cutting block with one cutting edge 16 in engagement with the material and the other edge upwardly disposed, and a presser member is brought down upon the last-mentioned cutting edge to force the other edge through the material to produce a blank. Either edge can be positioned upon the material, depending on whether it is desired to cut right or left blanks. During the cutting operation the projections 20 serve to hold the blade in vertical alinement with the core against lateral movement of the presser member as it is brought down upon the upper cutting edge, thus to prevent distortion of the blade.

Having described my invention, what I claim as new and desire to secure by Letters Patent of the United States is:

A cutting die comprising a thin metal core corresponding in shape to a blank to be cut, a blade extending along the periphery of the core and having a plurality of slits extending longitudinally of the blade along edge portions of the core, and projections struck from the blade along opposite sides of each slit and extending into engagement with opposite faces of the core.

GEORGE F. RYAN.

CERTIFICATE OF CORRECTION.

Patent No. 2,300,526.                                           November 3, 1942.

GEORGE F. RYAN.

It is hereby certified that error appears in the printed specification of the above numbered patent requiring correction as follows: First column, line 45, for "a symmetrical" read --asymmetrical--; and that the said Letters Patent should be read with this correction therein that the same may conform to the record of the case in the Patent Office.

Signed and sealed this 5th day of January, A. D. 1943.

Henry Van Arsdale,
(Seal)                       Acting Commissioner of Patents.